United States Patent [19]
Gainand et al.

[11] Patent Number: 5,986,236
[45] Date of Patent: Nov. 16, 1999

[54] APPARATUS FOR WORKING ON A TUBE PORTION USING A LASER BEAM, AND USE THEREOF ON PIPE TUBES ON A MARINE PIPE-LAYING OR PIPE RECOVERY BARGE

[75] Inventors: Yves Gainand, Maurepas; Alain Marechal, Plaisir; Jean-Paul Mas, Villemoisson-sur-Orge, all of France

[73] Assignee: Bouygues Offshore, Montigny-le-Bretonneux, France

[21] Appl. No.: 08/981,040

[22] PCT Filed: Jun. 6, 1996

[86] PCT No.: PCT/FR96/00852

§ 371 Date: Jun. 11, 1998

§ 102(e) Date: Jun. 11, 1998

[87] PCT Pub. No.: WO96/41697

PCT Pub. Date: Dec. 27, 1996

[30] Foreign Application Priority Data

Jun. 9, 1995 [FR] France ................................ 95 06827

[51] Int. Cl.⁶ .................................................. B23K 26/00
[52] U.S. Cl. ................................ 219/121.82; 219/121.63; 219/121.78
[58] Field of Search .................... 219/121.63, 121.67, 219/121.78, 121.79, 121.82, 121.86, 121.8, 121.6

[56] References Cited

U.S. PATENT DOCUMENTS

| | | |
|---|---|---|
| 4,001,543 | 1/1977 | Bove et al. ........................ 219/121.63 |
| 4,080,525 | 3/1978 | Gobetz ............................... 219/121.63 |
| 4,429,211 | 1/1984 | Carstens et al. .................... 219/121.63 |
| 4,533,814 | 8/1985 | Ward ............................. 219/121.63 X |
| 4,577,087 | 3/1986 | Chadwick ......................... 219/121.63 |
| 4,591,294 | 5/1986 | Foulkes ........................ 219/121.63 X |
| 4,623,229 | 11/1986 | Galan . |
| 5,593,605 | 1/1997 | Jones ................................. 219/121.63 |
| 5,601,735 | 2/1997 | Kawamoto et al. ............... 219/121.63 |
| 5,864,113 | 1/1999 | Cossi ................................. 219/121.67 |

FOREIGN PATENT DOCUMENTS

| | | |
|---|---|---|
| 2704166 | 10/1994 | France . |
| 63-115673 | 5/1988 | Japan ................................ 219/121.63 |

Primary Examiner—Gregory Mills
Attorney, Agent, or Firm—McDermott, Will & Emery

[57] ABSTRACT

The laser apparatus (L, G, T) is placed on a stand (B) which carries the support for the working head (T) of the apparatus in rotary manner, and the apparatus together with its stand are housed in a container (C) through which the tube passes, which container is fixed to the tube while work is taking place, the mass of the container together with that of its contents considerably damping the transmission of stresses from the tube to the working head.

9 Claims, 6 Drawing Sheets

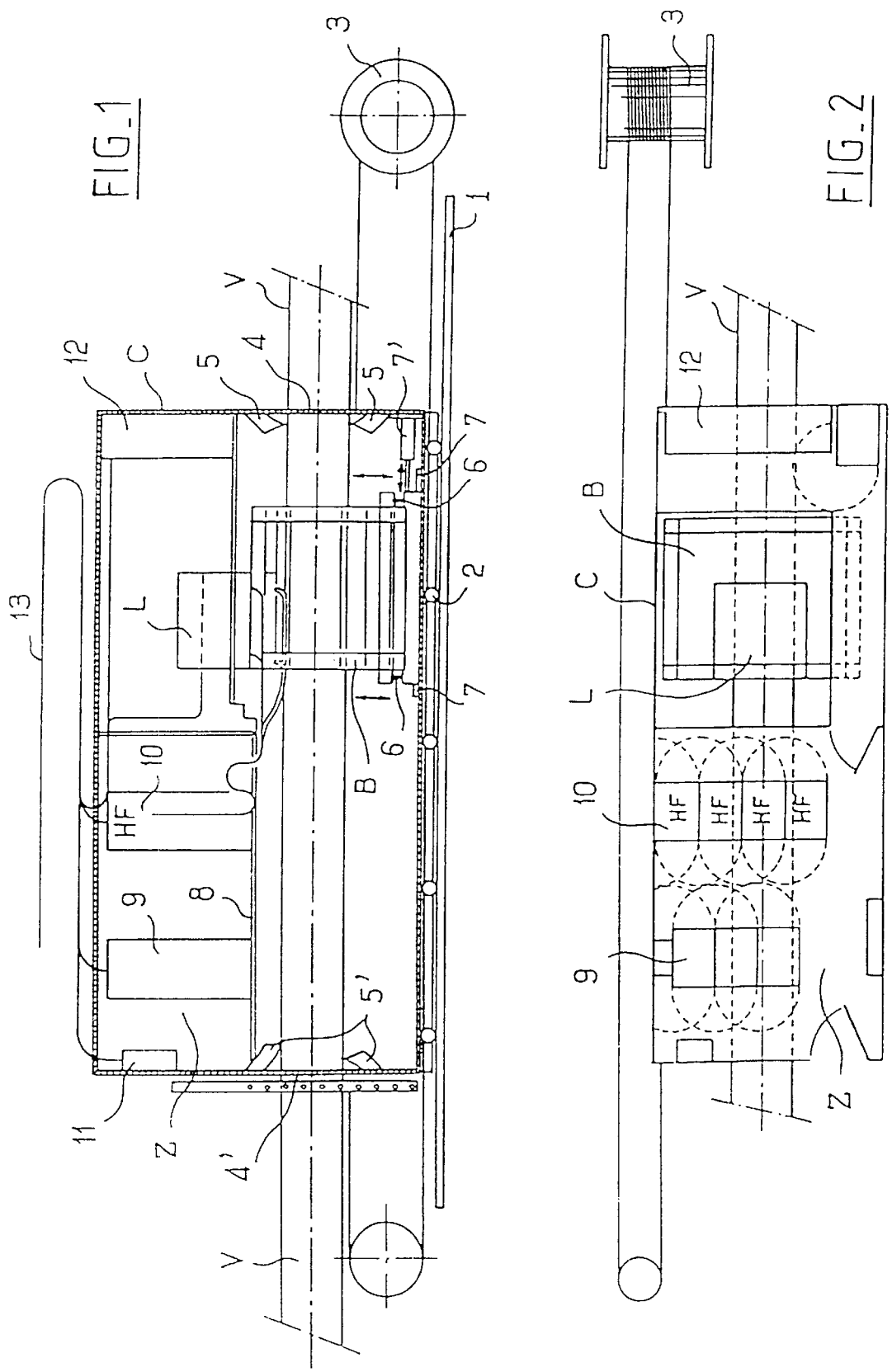

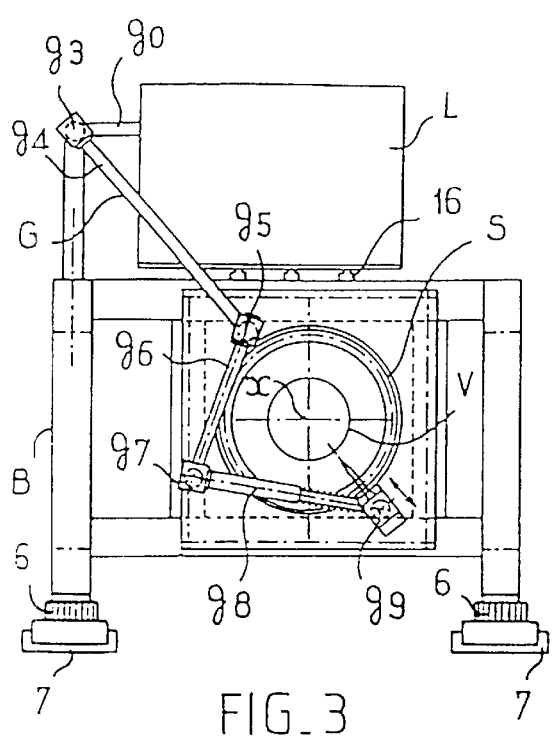
FIG_3
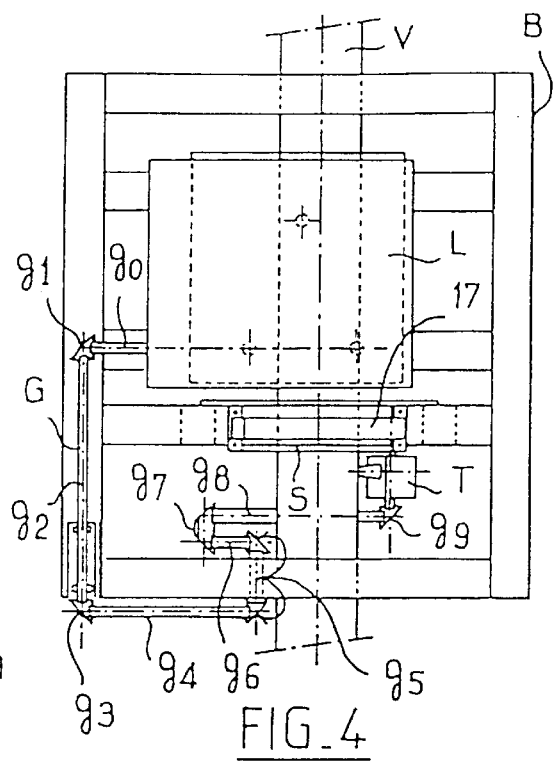
FIG_4
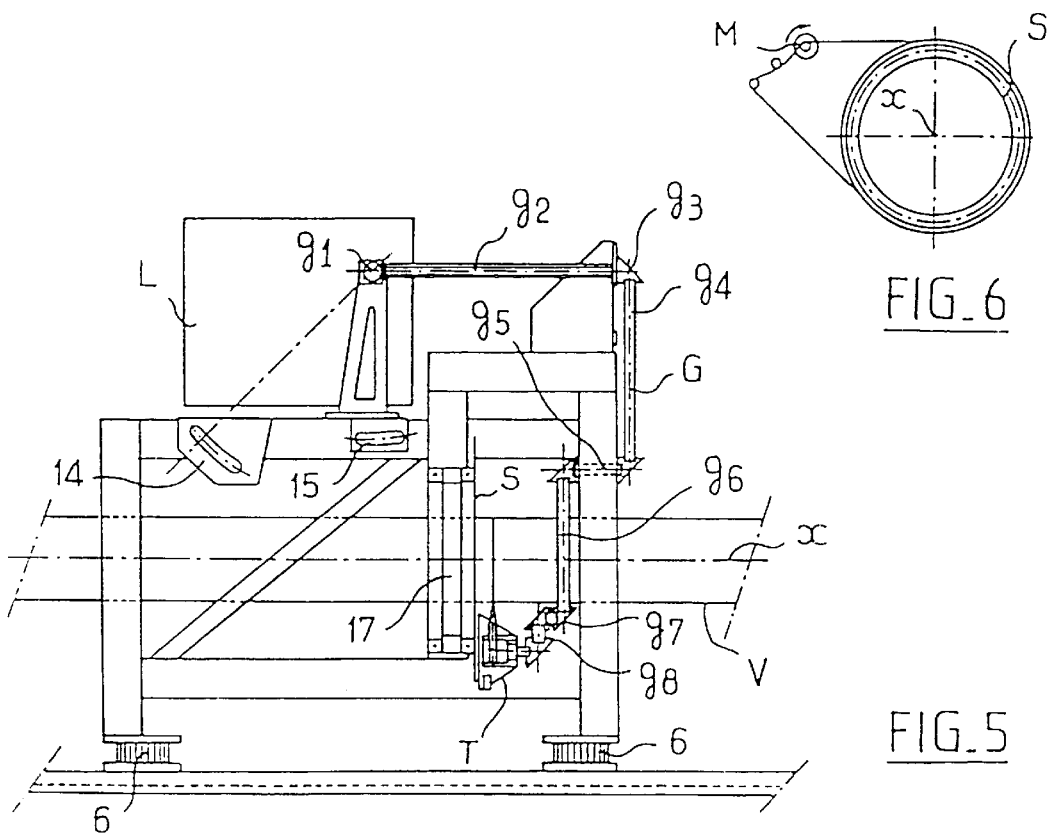
FIG_6
FIG_5

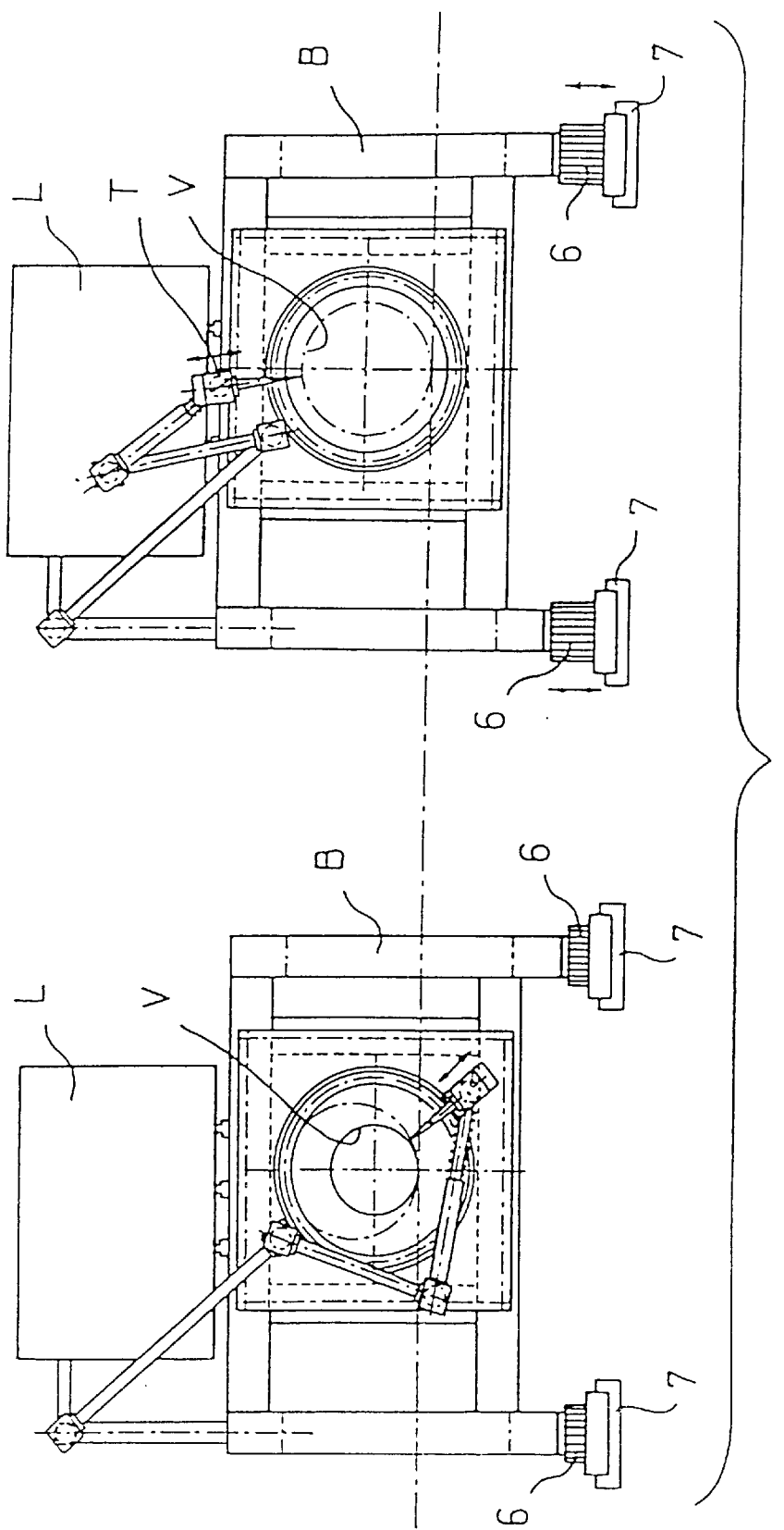
FIG_7

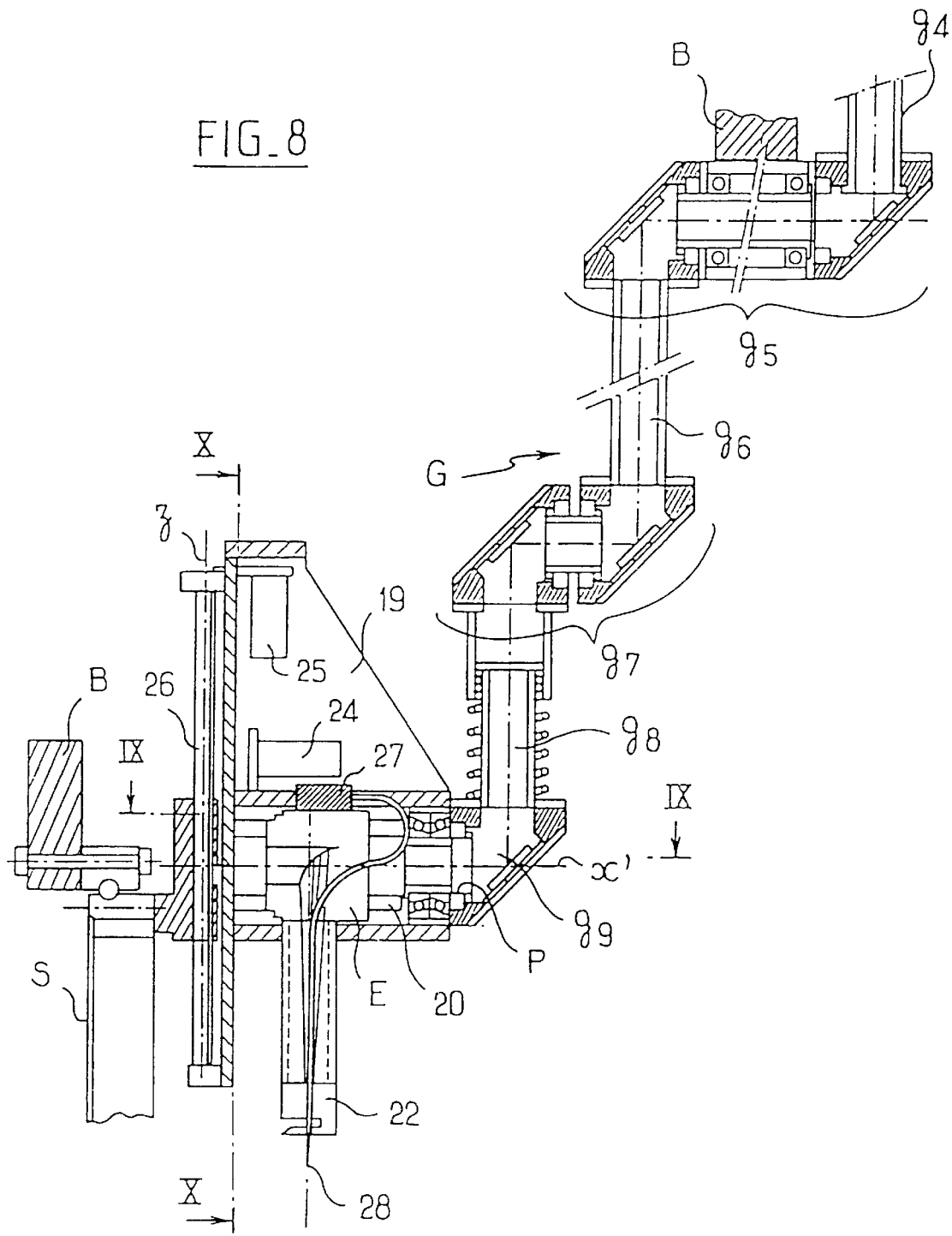
FIG_8

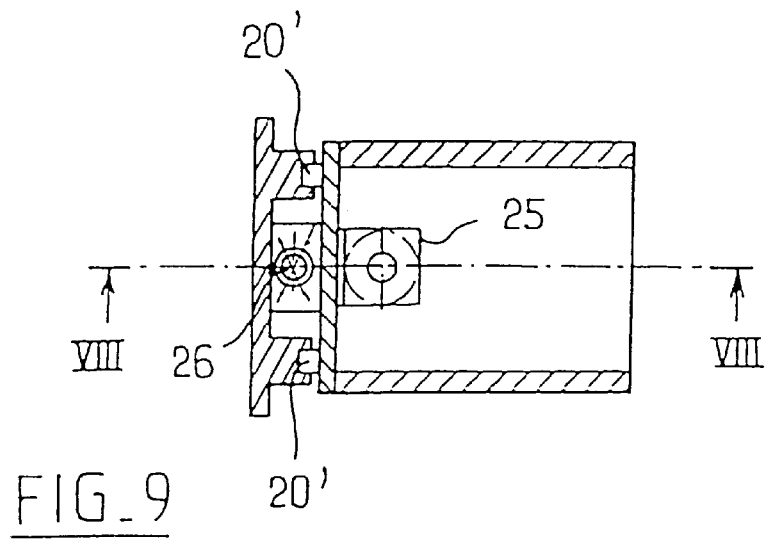
FIG_9
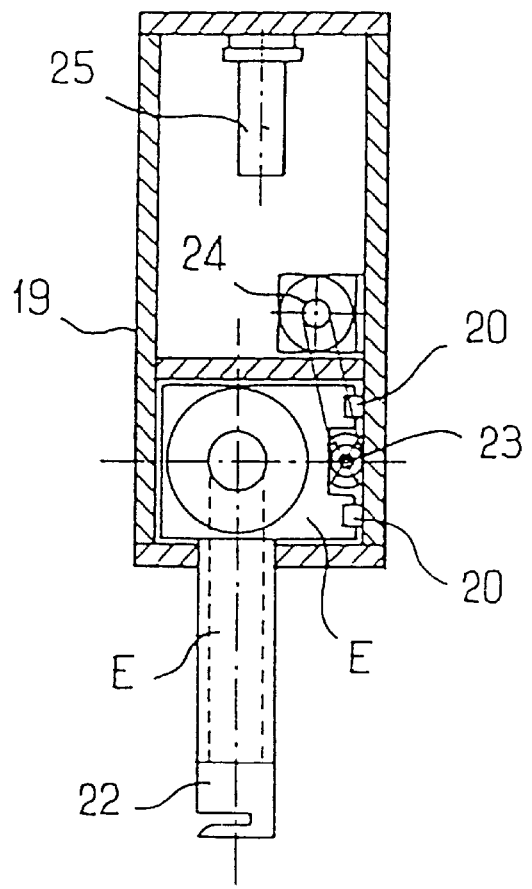
FIG_10

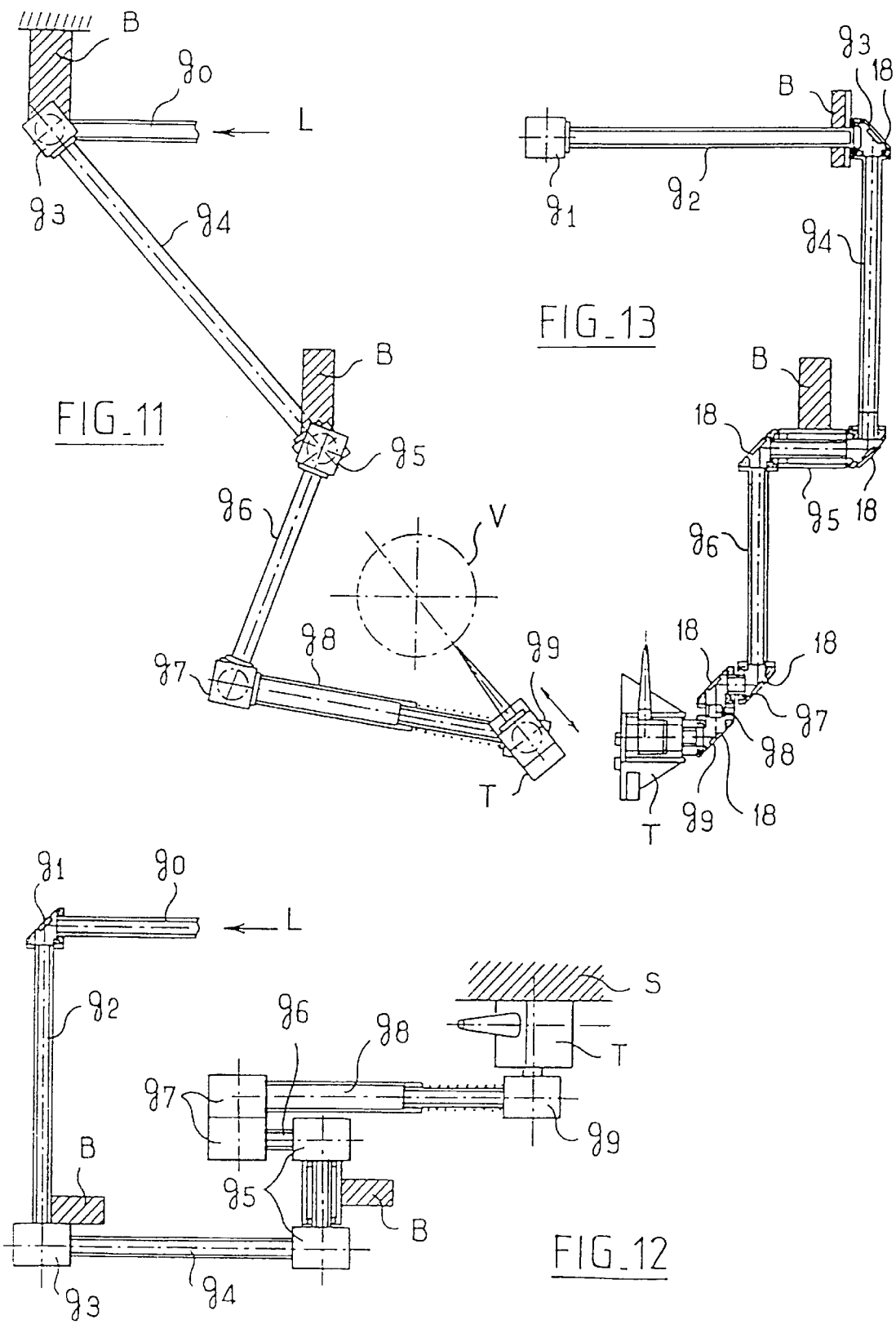

APPARATUS FOR WORKING ON A TUBE PORTION USING A LASER BEAM, AND USE THEREOF ON PIPE TUBES ON A MARINE PIPE-LAYING OR PIPE RECOVERY BARGE

The present invention relates to an installation for working on a zone of the wall of a tube by means of a laser beam directed at said zone and moved to scan the zone.

By way of example, the work may comprise cutting, or welding, or surface treatment.

Numerous devices have been proposed for performing such work. Essentially, they comprise a laser beam generator, a working head that includes both means for focusing the laser beam and an outlet nozzle for the focused beam, a waveguide for guiding the laser beam from the generator to the working head, and means for moving the working head so that the laser beam travels over the zone to be worked.

In certain applications, the means for moving the working head comprise a support that carries the working head and that revolves so that the working head moves around the tube, e.g. to cut the tube or to butt weld two tubes together.

The support which carries the working head must therefore be positioned accurately relative to the tube so that the axis of rotation of the support has a position that is defined relative to the tube, and that coincides therewith, at least approximately.

Publication FR-A-2 704 166 describes an installation as defined in the preamble of claim 1, and in which the rotary support is mounted on a plate which is directly fixed on the tube, however that solution is inappropriate when the tube is subjected to motion and vibration while the work is taking place, which applies in particular to tubes making up a pipeline that is being laid at sea from a barge. When working with a laser beam, it is most harmful for vibrations of the tube to be transmitted to the working head and to the beam waveguide.

To make a pipeline at sea, tubes of transportable length, generally 10 meters (m) to 24 are welded together on the "laying ramp" of the barge. After a tube has been welded into place, the barge is advanced by the length of the tube, with a corresponding length of pipeline being laid behind the barge. The barge is held in place by anchor lines and it is moved by winches. It is naturally subjected to the motion of the sea and its position is not absolutely fixed during welding even though the position of the pipeline which rests on the sea bed is practically constant along its axis. Relative movement is therefore continuously taking place between the barge and the pipework in the axial direction of the pipework, and this also gives rise to vibration.

An object of the present invention is to position the rotary support carrying the working head accurately relative to the tube without tube vibration being transmitted to the working head and to the waveguide connecting said head to the laser beam generator.

According to the invention, this object is achieved by placing the apparatus on a stand which carries the working head support in rotary manner, and in housing the apparatus and its stand inside a container having openings through which the tube can pass and including means for being temporarily fixed to the tube, the container also carrying the control cabinet and the high frequency cabinet for the laser generator, whereby the rotary support is fixed to the tube only via the container whose mass together with that of its contents considerably damps the transmission of stresses from the tube to the working head and to the waveguide.

The absence of direct fixing between the tube and the rotary support of the head also presents the advantage of making it very easy to adapt the system to tubes of different diameters.

By placing the high control cabinet and the frequency cabinet for the laser generator as stationary items in the container where the stand carrying the generator is also stationary during welding, it is certain that the high frequency cable connecting the high frequency cabinet to the generator is not subjected to any mechanical stress during welding, which is very important.

The invention also relates to a particular preferred embodiment of the working head.

In this embodiment, the working head includes a chassis fixed firstly to said rotary support and secondly to the end of the waveguide, and a movable assembly mounted to move in translation on the chassis and including both the focusing means for focusing the laser beam coming from the waveguide and the outlet nozzle for said beam, the axis of said translation being that of the incident laser beam on the focusing means and being parallel to the axis of rotation of the rotary support, said chassis also carrying a motor suitable for driving said assembly in translation under appropriate control.

It is sometimes necessary to cause the laser beam leaving the nozzle of the working head to perform small displacements as it rotates around the tube.

This can apply, for example, when butt welding two tubes together, where the abutment zone of the tubes to be scanned by the laser beam is not perfectly circular, whereas the head travels round a circle and the apparatus must include means for applying small correctional displacements to the beam leaving the head during the circular travel of the head.

Moving the head of the assembly constituted by the focusing means and the nozzle in translation along the chassis makes it possible to perform "join tracking" correction without such correction requiring the waveguide to be displaced since the chassis on which the assembly slides and to which the waveguide is fixed remains stationary during the corrective displacement.

In addition, by suitably programming the control of the motor that causes said assembly to move in translation, it is possible to cause the laser beam that leaves the head to have deliberately oscillating motion which is appropriate when welding with a filler metal, thus making it possible to weld together tubes having chamfered ends of great thickness without any need to increase the power of the laser, and also making it possible to weld together tubes made of material that is not normally weldable by means of a laser beam.

There follows a description of the embodiment of the invention designed for butt welding tubes together on a barge for laying a pipeline at sea, the description referring to the figures of the accompanying drawings, in which:

FIG. 1 is a general diagram of the installation seen in elevation;

FIG. 2 is a diagrammatic plan view of the installation;

FIGS. 3 to 5 are diagrams of the stand fitted with the laser generator, the waveguide, the working head, and the rotary support of the working head, shown respectively in end view (FIG. 3), in plan view (FIG. 4), and in side view (FIG. 5);

FIG. 6 is a diagram of drive means for the rotary support of the working head;

FIG. 7 is a view in which the lefthand side reproduces FIG. 3 while the righthand side shows the same apparatus adjusted for working on a tube of different diameter;

FIGS. 8 to 10 are diagrammatic views of the working head, respectively on section plans A—A (FIG. 8), B—B (FIG. 9), and C—C (FIG. 10); and FIGS. 11 to 13 are diagrammatic views of the waveguide and of the working head, in end view (FIG. 11), in plan view (FIG. 12), and in side view (FIG. 13).

The following description and the accompanying drawings disclose other characteristics of the present invention.

The installation shown in the figures essentially comprises a container C, and a stand B carrying apparatus constituted by a laser generator L, a waveguide G, a working head T, and a rotary support S.

The container C (FIGS. 1 and 2) which contains the stand and the apparatus carried by the stand is mounted on a barge represented by a guide rail 1 enabling the container to be moved longitudinally on the barge along the axis of the pipeline, e.g. by being mounted on wheels 2 and being moved on demand by a constant tension winch 3, or by motors driving the wheels. The container has an entrance 4 and an exit 4' through which tubes V pass, and it includes fixing and damping means enabling it to be fixed with damping to the tubes passing through it. These means are represented diagrammatically at 5 and 5' and may be constituted, for example, by abutments or by jaws provided with damping pads and actuated by actuators secured to the container so as to clamp the tubes between them.

By way of indication, in a typical example, the container is a rectangular box that is about 10 m long, about 5 m high, and about 3 m wide. It includes appropriate inspection hatches or openings, and means are provided to make it possible, from the outside, to control and observe the container and the controllable members found inside the container.

The stand B is disposed inside the container so as to be capable of being adjusted in height by means of actuators 6 and of being displaced longitudinally to adjust its position along tubes relative to the location of the weld to be made. In the solution shown, the stand slides on slideways 7 being driven by actuators 7' having a stroke of several tens of millimeters. The container also contains a floor 8 on which the control cabinet 9 and the high frequency cabinet 10 of the laser generator L are placed. The container is also fitted with air conditioning means 11 for air conditioning the zone Z of the container which contains the cabinets 9 and 10, and refrigerator means 12 for refrigerating the high frequency cabinet and the laser generator.

Umbilical cords 13 convey such water, gas, and electricity to the container as are required.

The stand is very rigid and supports the laser generator L (FIGS. 3 to 5) and adjustment means 14, 15, and 16 are provided to adjust at will the level and the trim of the generator on the stand so that the laser beam has the appropriate direction on leaving the generator.

The stand B also carries a plate 17 having a vertical turntable S mounted thereon to rotate about a horizontal axis $\underline{x}$, which turntable serves as a support for a head T connected by a waveguide G to the laser generator L. The plate and the turntable have a central passage for passing the tubes V. The turntable is rotated by a motor M and a transmission belt (FIG. 6).

The waveguide is made up in conventional manner by a sequence of rectilinear lengths $g_0$, $g_2$, $g_4$, $g_6$, and $g_8$ connected one to another by hinges $g_1$, $g_3$, $g_5$, $g_7$, and $g_9$. Each hinge is constituted by a single bend including a mirror that deflects the laser beam through 90°, or by two facing bends each including a deflecting mirror and connected together either directly or via a short rectilinear length.

All of the hinges are at locations on the stand which are fixed, with the exceptions of the last hinge $g_9$ which is secured to the head and which travels therewith, and of the penultimate hinge $g_7$ which is a double hinge being connected to the last hinge $g_9$ via a telescopic rectilinear length $g_8$ and to the preceding hinge $g_5$ via another rectilinear length $g_6$, the rectilinear lengths $g_6$ and $g_8$ acting like the legs of a compass whose vertex is constituted by the double hinge $g_7$.

The above-described waveguide is preferred in the present invention because it has a minimum of moving parts, however the person skilled in the art could choose some other type of waveguide for such and such a particular reason.

The working head T (FIGS. 8 to 10) in the invention comprises a chassis 19 carrying a slideway 20 for a moving assembly E which includes a parabolic focusing mirror 21 and an outlet nozzle 22 for the focussed beam. The chassis is designed to be fixed to the end of the waveguide G so that the laser beam coming from the waveguide penetrates into the chassis going towards the parabolic mirror along the translation axis x' of the assembly E, and the chassis 19 is also fixed to the rotary support S so that the translation axis x' is parallel to the axis of rotation $\underline{x}$ of the rotary support. The moving assembly E is moved in translation by a ball screw 23 driven by a motor 24 mounted on the chassis. The motor 24 is controlled by means that are known per se (and not shown) on the basis of signals delivered by a join detector fixed to the head so as to cause the laser beam that leaves the nozzle to move back towards the join between the two tubes that are to be welded together, should that be necessary ("join tracking").

The chassis 19 is fixed to the end of the waveguide G by any appropriate means that allow relative pivoting between the chassis and the waveguide about the axis x' of the laser beam. The fixing means are represented in FIG. 8 by a ring P.

The chassis 19 is fixed to the turntable S so as to capable of moving in translation on the turntable by means of slideways 20' extending along an axis $\underline{z}$ lying in the plane defined by the axes x' and $\underline{x}$ and extending perpendicularly thereto. This translation movement is controlled by a motor 25 mounted on the chassis 19 and actuating a ball screw 26. The motor is controlled in conventional manner on the basis of signals delivered by the join detector so that the distance between the point of focus of the laser beam and the outside surface of the join is appropriate for obtaining proper welding ("skin tracking").

It will be observed that during welding the length of the waveguide is substantially constant, with the only change in length being due to variation in the length of the telescopic arm due to movement of the head for skin tracking, which variation is at most of the order of 1 centimeter.

According to an advantageous feature of the invention, the moving assembly E also includes a dispenser 27 for feeding a filler metal 28 into a zone where welding is taking place.

On a barge for laying a pipeline at sea, the following operations are performed for welding and laying the pipeline:

the tube to be welded is presented to the end of the last tube of the pipeline and the two tubes are held together in an appropriate position for welding them together, this being done by conventional means, and preferably by internal clamping jaws;

the container is moved to bring the welding head to the vicinity of the zone where the weld is to be made and fixing means are engaged between the pipeline and the container;

the position of the stand is adjusted so that the working head is in an appropriate position to begin welding the join, taking the diameter of the tubes into account (FIGS. 1 to 7);

the join is welded;

the barge is advanced along the pipeline to lay in the sea the additional length thereof that has just been added by welding;

a new tube is presented for welding and the end of the pipeline is locked thereto by moving the internal clamping jaws to the location of the new join that is to be made;

the container which has remained fixed to the pipeline at the location of the preceding weld is released and brought up to the new welding position, it being specified that the container could be released before the barge has finished advancing so as to reduce container displacements and accelerate throughput; and the new join is welded.

To raise a pipeline laid at sea, the same operations as above can be performed in reverse order, with the laser beam outlet nozzle being fed with an appropriate gas in order to cut the pipeline up into tubes of appropriate length.

The invention is not limited to the embodiment described above.

We claim:

1. An installation for working, on a zone of a wall of a tube by means of a laser beam directed towards said zone, the installation comprising an apparatus which itself comprises a laser beam generator, a working head including both means for focusing the laser beam and an outlet nozzle for the focused beam, a waveguide for guiding the laser beam from the generator to the working head, and a rotary support for moving the working head around an axis, the installation being characterized in that it further comprises both a stand carrying the apparatus and on which the rotary support for the working head is mounted, and a container, the container having openings through which the tube can pass with means for fixing the container temporarily to the tube, the container also containing control and high frequency cabinets for the laser generator, such that the rotary support is fixed to the tube solely via the container whose mass together with the mass of its contents considerably damps the transmission of stresses from the tube to the working head and to the waveguide.

2. An installation according to claim 1, in which the container is fixed to the tube via damping means.

3. An installation according to claim 1, including means for adjusting the level of the stand inside the container as a function of the diameter of the tube.

4. An installation according to claim 1, including means for displacing the stand longitudinally inside the container in order to adjust its position relative to the working zone.

5. An installation according to claim 1, in which the container includes an air conditioned zone in which the control and high frequency cabinets of the laser generator are disposed on a floor.

6. An installation according to claim 1, in which the working head includes a chassis fixed firstly to said rotary support and secondly to the end of the waveguide, and a movable assembly mounted to move in translation on the chassis and including both the focusing means for focusing the laser beam coming from the waveguide and the outlet nozzle for said beam, the axis (x') of said translation being that of the incident laser beam on the focusing means and being parallel to the axis of rotation (x) of the rotary support, said chassis also carrying a motor suitable for driving said assembly in translation under appropriate control.

7. An installation according to claim 6, in which the filler metal dispenser is fixed to said assembly.

8. An installation according to claim 1, in which the working head includes a dispenser for feeding filler metal for welding work.

9. An installation according to claim 1, wherein said container is mountable on a barge.

* * * * *